United States Patent [19]

Eysel et al.

[11] Patent Number: 5,033,918

[45] Date of Patent: Jul. 23, 1991

[54] DEVICE FOR FINE ADJUSTMENT OF THE TURNING TOOL BIT OF A ROTATING RADIAL ADJUSTMENT HEAD

[75] Inventors: Dieter Eysel, Maintal; Wilfried Gerk, Rödermark; Gerhard Klee, Frankfurt; Hartmut Hirt, Königstein, all of Fed. Rep. of Germany

[73] Assignee: Samson AG, Frankfurt, Fed. Rep. of Germany

[21] Appl. No.: 556,875

[22] Filed: Jul. 20, 1990

Related U.S. Application Data

[63] Continuation of Ser. No. 367,970, Jun. 19, 1989, abandoned.

[30] Foreign Application Priority Data

Jun. 28, 1988 [DE] Fed. Rep. of Germany ....... 3821784

[51] Int. Cl.⁵ .................. B23B 29/03; B23Q 5/26; B23Q 16/00
[52] U.S. Cl. .................. 408/156; 408/150; 82/1.2; 82/133; 60/588
[58] Field of Search ................. 82/1.2, 1.4, 118, 133; 60/588; 408/147, 150, 156

[56] References Cited

U.S. PATENT DOCUMENTS 4,224,846  9/1980  Eysel et al. .................. 82/158
4,412,465 11/1983  Wright ........................ 82/1.2

Primary Examiner—William E. Terrell
Attorney, Agent, or Firm—Toren, McGeady & Associates

[57] ABSTRACT

A fine adjustment device for turning tool bits in the form of a pneumatic/hydraulic converter for converting of control signals into proportional actuating or adjusting forces with a combination of an oil pump and pneumatically controlled overflow valve, whose outlet pressure is adjustable with the help of control air.

1 Claim, 1 Drawing Sheet

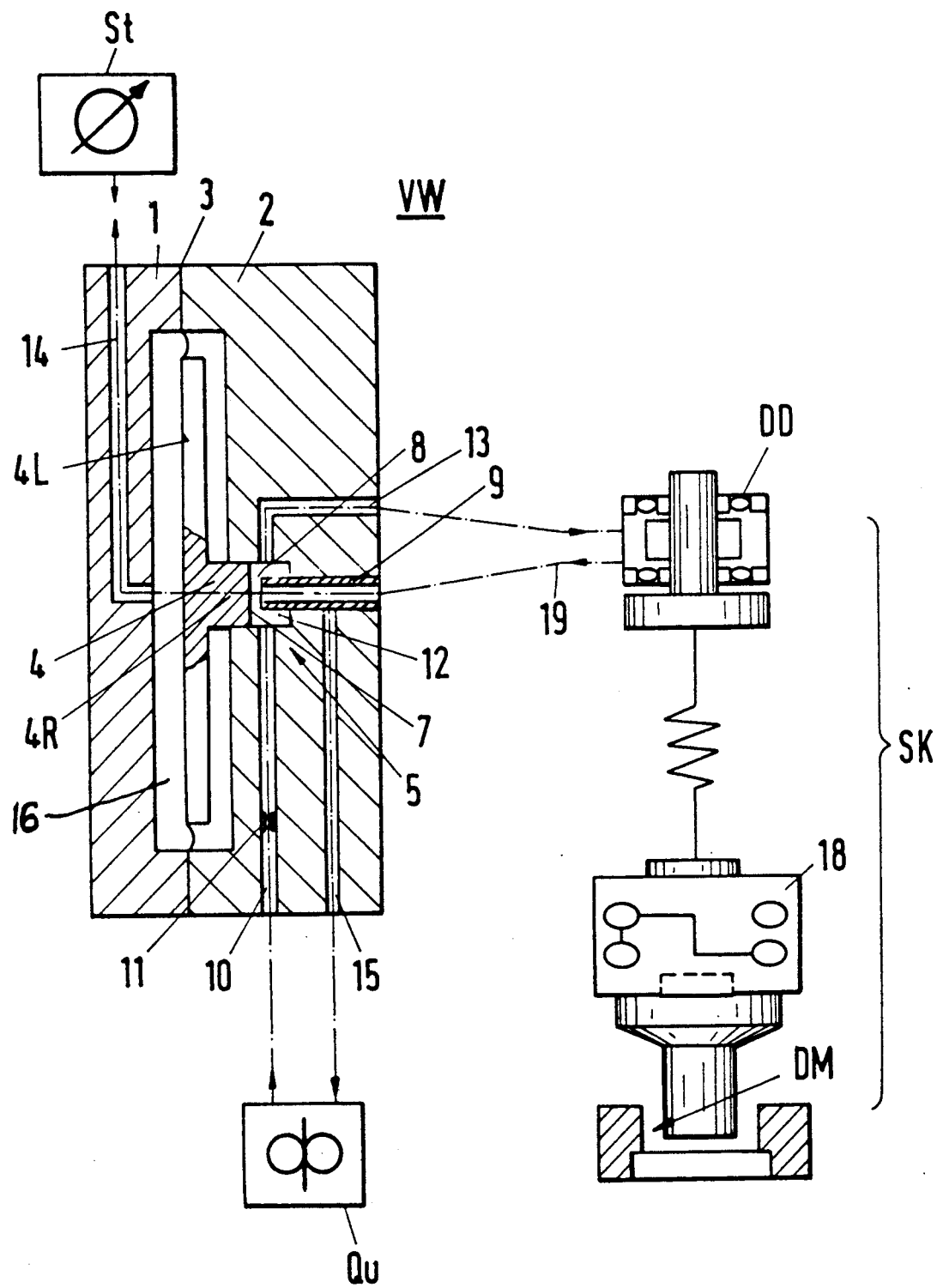

DEVICE FOR FINE ADJUSTMENT OF THE TURNING TOOL BIT OF A ROTATING RADIAL ADJUSTMENT HEAD

This is a continuation application of Ser. No. 07/367,970 filed June 19, 1989 abandoned.

BACKGROUND OF THE INVENTION

The invention is directed to a device for fine adjustment of a lathe turning tool bit of a rotating radial adjustment head with an adjustment member actuatable by a fluid, which acts upon a stiff spring member retaining the turning tool bit, which can be shifted elastically outwards, and with a rotary passage for the supply of the fluid, which is acted upon by the respective control pressure, to the adjustment member.

In a known radial adjustment head of this type, preferably used for machining the surface of a hollow cylinder and having a turning tool bit radially adjustable by hydraulic pressure with reference to the rotational axis of the drill head, the radial adjustment head, generally designated as drill head, is provided with a stiff parallel spring action joint for guiding of the turning tool bit. This parallel spring action joint is shifted radially outwards by small amounts by means of a piston or by an extension element. A pneumatic control pressure, generally an air pressure, is converted into a higher hydraulic working pressure by means of a pressure converter assigned to the drill head. The control pressure is fed as an adjustment pressure to the adjustment member, wherein oil under pressure can be replenished from an assigned storage container, if leakage losses arise within the hydraulic arrangement, compare DE-OS 24 26 409 (U.S. Pat. No. 3,977,194.

The piston of the pressure converter is pulled back with each start of a working process for compensation of leakage losses, so that a vacuum is formed in the region of the pressure oil. The vacuum opens a check valve so that the pressurized oil located in the storage container, which possibly is subjected to a slight overpressure, can flow back into the space provided for the liquid in the pressure converter. Since a revolving system must be balanced, the storage container and the check valve are arranged opposite each other in the known arrangement. In spite of this opposing arrangement of the storage container and check valve, out-of balance conditions resulting in vibrations are progressively generated by the storage leakage oil flowing into the hydraulic pressure system. Also, the oil stock must be small in order to avoid excessive inertia forces interfering with the rotational motion. In order to keep down this flawed behavior, the arrangement must be frequently shut down, in order to supplement the oil stock. In addition, the control air must be supplied through a rotary seal, which must be continuously lubricated, since otherwise at the high rpms the sealing lips would be rapidly destroyed. If the pressure converter and the radial adjustment head are to be designed as components separate from each other in space, then the pressurized oil must also be supplied to the radial adjustment head through a rotary transmission with a rotary seal. This is not easily possible because of the high adjustment pressure at the interrelated loads upon the rotary passage, which is then subjected to an early wear.

In order to avoid these difficulties it has been proposed to arrange an additional converter for generating a high adjustment pressure in the radial adjustment head and to connect the additional converter through the rotary transmission with the first converter converting the pneumatic control pressure into liquid pressure, the connection assuring unhindered fluid flow. This results in the rotary transmission being stressed less and in the avoidance of unbalanced conditions caused by losses of leakage oil, compare DE-OS ....(Patent application P 37 26 276.9).

It is further known in installations of the type being discussed here to perform an initial operation prior to each machining process, during which the pressure oil system is filled anew with oil; compare DE-OS 24 26 409 (U.S. Pat. No. 3,977,194).

SUMMARY OF THE INVENTION

Accordingly it is an object of the present invention to provide an apparatus for fine adjustment of the turning tool bit of a revolving radial adjustment head with an adjustment member actuatable by a fluid in such a way, that the mentioned losses of leakage oil have no effect upon the function of the radial adjustment head used.

Pursuant to this object, and others which will become apparent hereafter, one aspect of the present invention resides in an adjustable overflow valve for generating the adjustment pressure of the fluid acting o the adjustment member. A fluid flow generated by a pump passes through the adjustable overflow valve.

In a further embodiment, the outlet pressure of the overflow valve is adjustable by air pressure.

In still another embodiment, the outlet pressure of the overflow valves is adjustable by electric or magnetic forces.

In the invention, the converter, operating in the present case in a pneumatic/hydraulic manner, for converting the existing control signals into proportional actuating forces for adjusting the turning tool bit, is designed as a combination of an oil pump and preferably a pneumatically controlled overflow valve, whose outlet pressure is regulatable by means of the control air. This makes it possible for the first time to perform the adjustment of the turning tool bit continuously and each time without an initial operation and without loss of adjustment accuracy in spite of leakage losses at the rotary transmission and at other points of the apparatus.

The novel features which are considered as characteristic for the invention are set forth in particular in the appended claims. The invention itself, however, both as to its construction and its method of operation, together with additional objects and advantages thereof, will be best understood from the following detailed description when read in connection with the accompanying drawings.

BRIEF DESCRIPTION OF THE DRAWING

The single figure diagrammatically illustrates a fine adjustment device pursuant to the present invention.

DETAILED DESCRIPTION OF THE PREFERRED EMBODIMENTS

A control air source St which supplies pneumatic control pressure is connected with an adjustable overflow valve arranged as a converter VW functioning in a pneumatic/hydraulic fashion. The converter VW consists of two housing halves 1, 2, between which a diaphragm 3 is clamped. The diaphragm acts upon a twin piston 4, whose left piston portion 4L, with reference to the drawing, has a large diameter and whose right piston portion 4R has a small diameter.

The right piston portion 4R is guided in a bore 5 of the housing part 2 and throttles with its front face 7 a valve seat 8 of a tube 9 of very small diameter, which projects into the bore 5.

Furthermore, an oil pump Qu is provided, from whose outlet pressure oil flows through a channel 10 and an initial choke 11 into a pressure space 12 formed by the bore 5 of the housing part 2. The pressure space 12 is in connection with an adjustment apparatus generally designated with SK through a channel 13.

The control air source St is connected through a channel 14 with a control pressure space 16 arranged to the left of the diaphragm 3 in the drawing in order to feed the control pressure to said control pressure space 16.

The adjustment apparatus SK comprises a rotary transmission DD and a revolving pressure controlled radial adjustment head 18 connected with the rotary portion of the rotary transmission. Pressure oil is supplied through the rotary passage from the channel 13 through the revolving portion of the rotary packing bushing. The rotary portion is connected with the actuating member not depicted here and arranged in the radial adjustment head 18, by means of which an excursion of the turning tool bit DM proportional to the oil pressure supplied to the radial adjustment head 18 is achieved.

The operational mode of the device described above is as follows.

In order to put the device into operation, the oil pump $Q_u$ is switched on and oil flows through channel 10 and through the choke 11 into the pressure space 12. After having passed the gap between the front face 7 of the right piston portion 4R and the valve seat 8, the oil flows through the tube 9 and the channel 15 back to the oil pump.

If the control air pressure at the outlet of the control air source ST increases, air is directed through the channel 14 to the large left piston portion 4L of the twin piston 4. Because of this, the twin piston 4 moves to the right in the drawing and throttles the valve seat 8. Now the pressure in the pressure space 12 increases until the forces acting upon the smaller right piston portion 4R and directed to the left in the drawing are equal to the forces directed toward the right side and generated by the control air acting upon the large left piston portion 4L.

The area ratio of the choke valve 11 to the throttling gap between the front face 7 and the valve seat 8 always assumes a value, where the product from the large piston surface and the control air pressure is equal to the product from the surface of the small piston and the hydraulic adjusting pressure, so that the required proportionality between a control- and adjustment signal is obtained.

Naturally, other elements, for instance a tubular slide valve or similar device, can be used for throttling the oil flow.

Since the pressure space 12 is connected with the radial adjustment head 18 by the channel 13, there exists a proportionality between the position of the turning tool bit DM and the pressure in the pressure space 12. Since, as has already been mentioned, the pressure in the pressure space 12 is proportional to the control air pressure, this proportionality also exists between the control air pressure and the travel of the turning tool bit DM. The pressure ratio between air pressure and oil pressure depends upon the piston area ratio of the large- and small piston parts of the twin pistons 4 and as a rule has a value between 100 and 1000.

It can be expedient to return leakage oil, which escapes for instance at the rotary transmission DD or at other points, back to the sump of the pump. A connection 19 between the rotary transmission and the return line 14 serves for this purpose, and acts as an oil return line. It can further be expedient, to produce overflow forces between the valve seat 8 and front face 7 not by an air pressure, but rather by other means, for instance electrical or magnetic forces. This can be advantageous in the case of signal processing While the invention has been illustrated and described as embodied in a device for fine adjustment of the turning tool bit of a rotating radial adjustment head, it is not intended to be limited to the details shown, since various modifications and structural changes may be made without departing in ny way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

1. A device for fine radial adjustment of a turning tool in a rotating head, comprising:
    a pump which generates a fluid flow at an input pressure;
    a controllable air source which generates control air at an adjustment pressure;
    an adjustable overflow valve which is a pneumatically-hydraulically functioning converter which as housing halves which clamp a diaphragm therebetween, and a twin piston assigned to the diaphragm, which twin piston has a first piston portion having a large diameter and being arranged so as to receive the control air from the controllable air source, the twin piston also having a second piston portion with a diameter smaller than the first piston portion and being guided in a bore in one of the housing halves, which bore forms a pressure space which is connected with the pump through a choke so that the fluid flow of the pump is directed to the pressure space, said converter further including a valve seat having a diameter smaller than the diameter of the second piston portion, and the second piston portion having a front face for coacting with the valve seat, the diameters of the first and second piston portions being proportionately sized so that the converter generates an outlet pressure of the fluid flow proportional to the adjustment pressure generated by the controllable air source; and
    adjustment means including the rotating head which is connected to the converter and which is actuable by the outlet pressure of the converter so as to position the turning tool, the adjusting means further including a rotary transmission arranged so as to supply the fluid at the outlet pressure from the converter to the rotating head, the valve seat being arranged so as to communicate through the rotary transmission with the rotating head.

* * * * *